United States Patent
Canella et al.

(10) Patent No.: US 10,095,937 B2
(45) Date of Patent: Oct. 9, 2018

(54) APPARATUS AND METHOD FOR PREDICTING TARGETS OF VISUAL ATTENTION

(71) Applicant: GM Global Technology Operations LLC, Detroit, MI (US)

(72) Inventors: David A. Canella, Toronto (CA); Jarvis Chau, Markham (CA); Steve A. Warden, Port Perry (CA)

(*) Notice: Subject to any disclaimer, the term of this patent is extended or adjusted under 35 U.S.C. 154(b) by 225 days.

(21) Appl. No.: 15/188,039

(22) Filed: Jun. 21, 2016

(65) Prior Publication Data
US 2017/0364760 A1   Dec. 21, 2017

(51) Int. Cl.
*G06K 9/00* (2006.01)
*G06F 3/01* (2006.01)
*G06T 7/00* (2017.01)

(52) U.S. Cl.
CPC ......... *G06K 9/00845* (2013.01); *G06F 3/013* (2013.01); *G06K 9/00604* (2013.01); *G06T 7/0046* (2013.01); *G06T 2207/20076* (2013.01); *G06T 2207/30201* (2013.01)

(58) Field of Classification Search
CPC .............. A61B 5/18; B60R 21/01538; G06K 9/00832; G06K 9/00791; G06T 2207/30248; G06T 2207/30261; G06T 2207/30268
See application file for complete search history.

(56) References Cited

U.S. PATENT DOCUMENTS

| | | | | |
|---|---|---|---|---|
| 8,885,882 | B1* | 11/2014 | Yin ........................... | G06F 3/00 382/103 |
| 2015/0002394 | A1* | 1/2015 | Cho ................... | G02B 27/0093 345/156 |
| 2015/0199005 | A1* | 7/2015 | Haddon .................. | G06F 3/013 345/163 |
| 2016/0029883 | A1* | 2/2016 | Cox ........................ | G06F 3/013 351/209 |
| 2016/0084661 | A1* | 3/2016 | Gautama .............. | G01C 21/365 701/400 |
| 2016/0210503 | A1* | 7/2016 | Yin ........................... | G06F 3/00 |

(Continued)

OTHER PUBLICATIONS

Doshi et al. ("Head and eye gaze dynamics during visual attention shifts in complex environments") 2012.*

(Continued)

*Primary Examiner* — Avinash Yentrapati

(57) ABSTRACT

An apparatus for tracking a gaze of a user is provided. The apparatus includes a memory including computer executable instructions; and a processor that reads and executes the computer executable instructions. The instructions cause the processor to receive gaze information associated with the gaze of the user; based on the gaze information, determine whether change information associated with the gaze of the user is greater than a threshold value; and in response to determining the change information is greater than the threshold value, predict at least one from among a gaze vector of the gaze of the user and a location of a gaze target of the gaze of the user based on a kinematic model. The gaze tracking apparatus may be used in a vehicle to perform vehicle functions based on the gaze of a user of a vehicle or to update gaze modeling database.

18 Claims, 2 Drawing Sheets

(56) References Cited

U.S. PATENT DOCUMENTS

2016/0298971 A1* 10/2016 Mughal ................ B60W 50/14
2017/0172675 A1*  6/2017 Jarc ...................... A61B 90/361

OTHER PUBLICATIONS

Doshi et al. ("A Comparative Exploration of Eye Gaze and Head Motion Cues for Lane Change Intent Prediction") 2008.*
Valenti et al ("Combining Head Pose and Eye Location Information for Gaze Estimation").*

* cited by examiner

APPARATUS AND METHOD FOR PREDICTING TARGETS OF VISUAL ATTENTION

Apparatuses and methods consistent with exemplary embodiments relate to gaze tracking and detection. More particularly, apparatuses and methods consistent with exemplary embodiments relate to predicting targets of a gaze of a user or visual attention of a user.

SUMMARY

One or more exemplary embodiments address the above issues by providing a gaze tracking apparatus. More particularly, one or more exemplary embodiments provide a gaze tracking apparatus that is capable of tracking a user's gaze and predicting a target of a user's gaze with more accuracy even when a user's gaze is directed to areas where a sensor is unable to detect a user's gaze or is limited in its capability to detect a user's gaze.

According to an aspect of an exemplary embodiment, a method for tracking a gaze of a user in a vehicle is provided. The method includes receiving gaze information associated with the gaze of the user; based on the gaze information, determining whether change information associated with the gaze of the user is greater than a threshold value; and in response to determining that the change information is greater than the threshold value, predicting at least one from among a gaze vector of the gaze of the user and a location of a gaze target of the gaze of the user based on a kinematic model.

The determining whether the change information associated with the gaze of the user is greater than the threshold value may be performed in response to receiving a plurality of samples of the gaze information.

The predicting the gaze vector may include determining whether the predicted gaze vector corresponds to a location associated with a function; in response to determining that the predicted gaze vector corresponds to the location associated with the function, determining a likelihood that the predicted gaze vector corresponds to the location associated with the function based on at least one from among historical usage information and vehicle context information; and executing the function based on the determined likelihood.

The historical usage information may include at least one from among functions previously initiated by the user, previously stored gaze vectors of the user within a predetermined threshold from the gaze vector, a number of times a function is initiated by the user, locations previously targeted by the user, and a number of times a location has been previously target by the user.

The vehicle context information may include information on at least one from among an event associated with a vehicle, steering of a vehicle, turn indicator status, a speed of a vehicle, a location of a vehicle, an engine event or status, emission status, revolutions per minute of an engine, transmission status, tire pressure, door open/close status, trunk open/close status, window open/close status, interior/exterior temperature, barometric pressure, acceleration of a vehicle, user input, user applied pressure to an object or button in a vehicle, whether a passenger is in a seat, location and speed of external objects around the vehicle, information on which lights of a vehicle are activated, whether a car key is present in a vehicle, and a currently displayed screen on a display in a vehicle, a status of a vehicle, a status of a setting of a vehicle, identifiable visual stimulus which a user is to perceive, and a location of a function that is executable by the user.

The predicting the location of the gaze target may include determining whether coordinates of the predicted location are within a detectable area; in response to determining that the coordinates are within the detectable area, calculating a difference between the predicted location and the location of the gaze target and updating the kinematic model based on the calculated difference; and in response to determining that the coordinates are outside the detectable area, executing a function based on the predicted location.

The gaze information may include coordinate information of the gaze of the user and timing information of the gaze of the user.

The kinematic model may be calculated based on the coordinate information and the timing information.

The threshold value may be an indicator of whether the gaze of the user is outside of an area in which the gaze of the user is trackable within a specific degree of accuracy.

According to an aspect of another exemplary embodiment a non-transitory computer readable medium comprising instructions executable by a computer to perform the method for tracking a gaze of a user in a vehicle is provided.

According to an aspect of another exemplary embodiment, an apparatus for tracking a gaze of a user is provided. The apparatus includes at least one memory comprising computer executable instructions; and at least one processor configured to read and execute the computer executable instructions. The computer executable instructions cause the at least one processor to: receive gaze information associated with the gaze of the user; based on the gaze information, determine whether change information associated with the gaze of the user is greater than a threshold value; and in response to determining that the change information is greater than the threshold value, predict at least one from among a gaze vector of the gaze of the user and a location of a gaze target of the gaze of the user based on a kinematic model.

The at least one processor may be configured to determine whether the change information associated with the gaze of the user is greater than the threshold value in response to receiving a plurality of samples of the gaze information.

The predicting the gaze vector may include determining whether the predicted gaze vector corresponds to a location associated with a function; in response to determining that the predicted gaze vector corresponds to the location associated with the function, determining a likelihood that the predicted gaze vector corresponds to the location associated with the function based on at least one from among historical usage information and vehicle context information; and executing the function based on the determined likelihood.

The historical usage information may include at least one from among functions previously initiated by the user, previously stored gaze vectors of the user within a predetermined threshold from the gaze vector, a number of times a function is initiated by the user, locations previously targeted by the user, and a number of times a location has been previously target by the user.

The vehicle context information may include information on at least one from among an event associated with a vehicle, steering of a vehicle, turn indicator status, a speed of a vehicle, a location of a vehicle, an engine event or status, emission status, revolutions per minute of an engine, transmission status, tire pressure, door open/close status, trunk open/close status, window open/close status, interior/exterior temperature, barometric pressure, acceleration of a vehicle, user input, user applied pressure to an object or button in a vehicle, whether a passenger is in a seat, location and speed of external objects around the vehicle, information on which lights of a vehicle are activated, whether a car key is present in a vehicle, and a currently displayed screen on a display in a vehicle, a status of a vehicle, a status of a setting of a vehicle, identifiable visual stimulus which a user is to perceive, and a location of a function that is executable by the user.

The predicting the location of the gaze target may include: determining whether coordinates of the predicted location are within a detectable area; in response to determining that the coordinates are within the detectable area, calculating a difference between the predicted location and the location of the gaze target and updating the kinematic model based on the calculated difference; and in response to determining that the coordinates are outside the detectable area, executing a function based on the predicted location.

The gaze information may include the coordinate information of the gaze of the user and the timing information of the gaze of the user.

The kinematic model may be calculated based on the coordinate information and the timing information.

The threshold value may be an indicator of whether the gaze of the user is outside of an area in which the gaze of the user is trackable within a specific degree of accuracy.

The specific degree of accuracy may be three degrees or less.

Other objects, advantages and novel features of the exemplary embodiments will become more apparent from the following detailed description of exemplary embodiments and the accompanying drawings.

DETAILED DESCRIPTION

Figure 1:
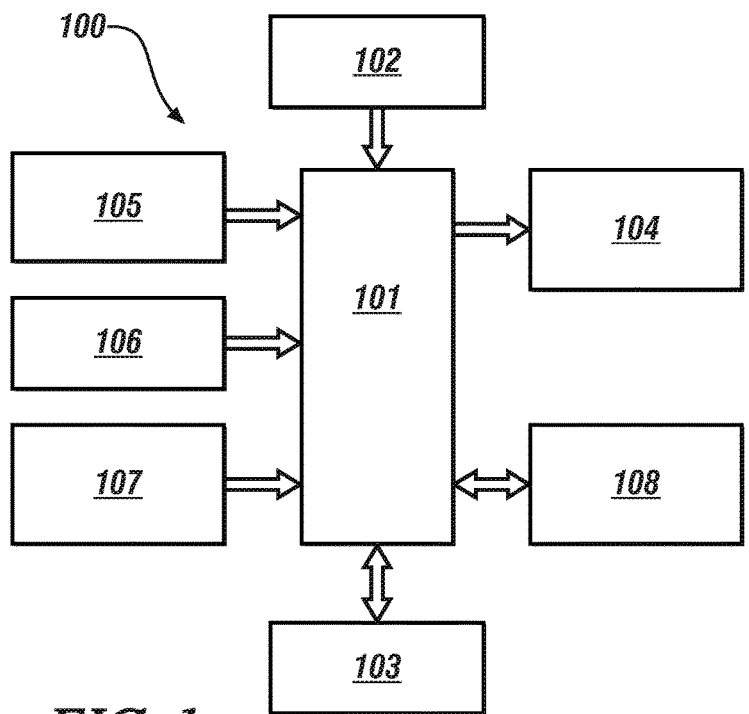
FIG. 1 shows a block diagram of a gaze tracking apparatus according to an exemplary embodiment.

Apparatuses for tracking a gaze of a user or visual attention of a user use sensors that detect actions performed by a user and that output information corresponding to the user's actions. The information from the sensors is then used to determine information associated with the user's gaze. For example, a gaze of a user may be directed to a target of visual attention as observed using a point in 2D or 3D space upon which the eyes are focused. However, gaze tracking apparatuses are still limited in accuracy with respect to tracking a gaze and determining a target of a gaze of a user. Thus, there is a need for a gaze tracking apparatus that is capable of more accurately tracking the gaze of the user and determining a target of the gaze of the user.

A gaze tracking apparatus and method thereof will now be described in detail with reference to FIGS. 1-4 of the accompanying drawings in which like reference numerals refer to like elements throughout. The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "receive" information from a second element, the first element may receive the information directly from the second element, receive the information via a bus, receive the information via a network, or receive the information via intermediate elements, unless the first element is indicated to receive information "directly" from the second element.

Throughout the disclosure, one or more of the elements disclosed may be combined into a single device or combined into one or more devices. In addition, individual elements may be provided on separate devices.

FIG. 1 shows a block diagram of a gaze tracking apparatus 100 according to an exemplary embodiment. As shown in FIG. 1, the gaze tracking apparatus 100, according to an exemplary embodiment, includes a controller 101, a power supply 102, a storage 103, an output 104, a gaze detection sensor 105, a user input 106, a vehicle status input 107, and a communication device 108. However, the gaze tracking apparatus 100 is not limited to the aforementioned configuration and may be configured to include additional elements and/or omit one or more of the aforementioned elements.

The controller 101 controls the overall operation and function of the gaze tracking apparatus 100. The controller 101 may control one or more of the storage 103, the output 104, the gaze detection sensor 105, the user input 106, the vehicle status input 107, and the communication device 108 of the gaze tracking apparatus 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

The power supply 102 provides power to one or more of the storage 103, the output 104, the gaze detection sensor 105, the user input 106, the vehicle status input 107, and the communication device 108 of the gaze tracking apparatus 100. The power supply 102 may include one or more from among a battery, an outlet, a capacitor, a solar energy cell, a generator, a wind energy device, an alternator, etc.

The storage 103 is configured to store information and to retrieve information used by the gaze tracking apparatus 100. The storage 103 may be controlled by the controller 101 to store and retrieve vehicle context information, historical usage information, etc. The storage may also store a predictive model or predictive model database containing information on gaze patterns of the user and functions associated with the gaze patterns of the user. The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in a visual, audible or haptic form. The output 104 may be controlled by the controller 101 to provide outputs to the user of the gaze tracking apparatus 100. The output 104 may include one or more from among a speaker, a display, a heads up display, haptic feedback device, a vibration device, a tap-feedback device, a holographic display, etc.

The gaze detection sensor 105 is configured to detect a location of a gaze of the user and a direction of movement of the gaze of the user and provide information on the location and the direction to the gaze tracking apparatus 100 and the controller 101. The gaze detection sensor 105 may include one or more from among an infrared camera, a camera, a near infra-red camera, an active light camera, an ultrasonic sensor, a radar device, etc. The gaze detection sensor 105 may provide the information to the controller 101 to be processed so that the controller may perform functions based on one or more of the location of a gaze of the user, the location of the user, the direction of movement of the gaze of the user, and the predicted target of the gaze of the user.

The user input 106 is configured to provide inputs information and commands to the gaze tracking apparatus 100. The user input 106 may be used to provide user inputs, etc. to the controller 101. The user input 106 may include one or more from among a touchscreen, a keyboard, a soft keypad, a button, a motion detector, a voice input detector, a microphone, a camera, a trackpad, a mouse, a touchpad, etc.

The vehicle status input 107 is configured to receive vehicle information and provide the vehicle information to the gaze tracking apparatus 100. The vehicle status input 107 may be used to provide vehicle context information, etc. to the controller 101. The vehicle context information may be received from sensors or devices that capture information about the vehicle, may be read from storage 103 where the vehicle context information is stored or received via communication device 108. The vehicle context information may be provided by sensors or devices such as one or more from among a Global Positioning System (GPS) device, a speedometer, an odometer, an engine sensor, an emission sensor, a transmission sensor, a tire pressure sensor, a door sensor, a trunk sensor, a window sensor, an interior/exterior temperature sensor, a barometric pressure sensor, an acceleration sensor, a gyroscopic sensor, a touch force or pressure sensor, a seat sensor, a passenger sensor, a collision sensor, an external object detector, an ultrasonic sensor, a radar sensor, a thermometer, an ambient light sensor, a rain sensor, an altimeter, an electronic control unit (e.g., an electronic controller, etc.), a car light activation sensor, a car key sensor, a car information and entertainment device (i.e., an infotainment device), a communication device etc.

The vehicle context information may include information on one or more from among an event associated with a vehicle, steering of a vehicle, turn indicator status, a speed of a vehicle, a location of a vehicle, an engine event or status, emission status, revolutions per minute of an engine, transmission status, tire pressure, door open/close status, trunk open/close status, window open/close status, interior/exterior temperature, weather, rain, barometric pressure, altitude of a vehicle, acceleration of a vehicle, user input, user applied pressure to an object or button in a vehicle, whether a passenger is in a seat, location and speed of external objects around the vehicle, which lights of a vehicle are activated, whether a car key is present in a vehicle, a currently displayed screen on a display in a vehicle, daytime or nighttime status, an amount of light, a status of a vehicle, a status of a setting of a vehicle, identifiable visual stimulus which a user is to perceive, and a location of a function that is executable by the user.

The communication device 108 may be used by gaze tracking apparatus 100 to communicate with various types of external devices according to various communication methods. The communication device 108 may be used to provide gaze information, vehicle context information, historical usage information, etc. to the controller 101 and the gaze tracking apparatus 100. The communication device 108 may be used by the controller 101 to send commands to perform functions.

The communication device 108 may include various communication modules such as a broadcast receiving module, a near field communication (NFC) module, a GPS module, and a wireless communication module. The broadcast receiving module may include a terrestrial broadcast receiving module including an antenna to receive a terrestrial broadcast signal, a demodulator, and an equalizer, and a digital multimedia broadcasting (DMB) module to receive and process a DMB broadcast signal. The NFC module is a module that communicates with an external apparatus located at a nearby distance according to an NFC method. The GPS module is a module that receives a GPS signal from a GPS satellite and detects a current location. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, or ZigBee.

According to an exemplary embodiment, the controller 101 of the gaze tracking apparatus 100 is configured to receive gaze information associated with the gaze of the user from the gaze detection sensor 105. Based on the gaze information, the controller 101 determines whether change information associated with the gaze of the user is greater than a threshold value. In this case, the change information may include vector information that indicates a direction that the user is looking. In response to determining that the change information is greater than the threshold value, the controller 101 is configured to predict at least one from among a gaze vector of the gaze of the user and a location of a gaze target of the gaze of the user based on a kinematic model. Moreover, the controller 101 may be configured to determine whether the change information associated with the gaze of the user is greater than the threshold value in response to receiving a plurality of samples of the gaze information.

The gaze information may include coordinate information of the gaze of the user and timing information of the gaze of the user. The kinematic model may be calculated based on the coordinate information and the timing information. The coordinate information and the timing information may be used to determine a magnitude of a velocity (e.g., direction and speed) at which the eyes are moving. Using an appropriate fixed sampling rate, if a change in user gaze location is above a predetermined threshold then it is possible to determine that a transition in the gaze of the user is occurring. For example, it is possible to track a transition of a gaze of the user from one target to another target location based on distances between gaze coordinate information. In other words, as a distance between gaze coordinates increases, a transition state from one gaze target to another gaze target may be predicted and the target may be predicted based on a direction determined based on the gaze coordinates in the transition state. In another example, the kinematic model may be calculated by using a component of distances between coordinate information over a period of time. In particular, the kinematic model may be calculated based on a comparison between a distance between most recently sampled coordinates and a moving average of distances between a predetermined number of previous samples of coordinates.

The threshold value is an indicator of whether the gaze of the user is in the process of changing from one target of fixation to another target of fixation. The threshold value can be a predetermined constant value or can be a variable value calculated using immediately preceding sample data or a rolling average of recent velocity values or distance values. In addition, the threshold value may be adjusted based on historical gaze data. The specific degree of accuracy may be one degree or less, three degrees or less or may vary depending on the application or equipment.

The controller 101 may be configured to predict the gaze vector by determining whether the predicted gaze vector corresponds to a location associated with a function or an area of interest, and in response to determining that the predicted gaze vector corresponds to the location associated with the function, the controller 101 is configured to determine a likelihood that the predicted gaze vector corresponds to the location associated with the function based on at least one from among historical usage information and vehicle context information. The controller 101 may then control to perform the function or otherwise carry out additional functions based on the determined likelihood.

The historical usage information may be information including one or more of functions previously initiated by a user, previously stored gaze vectors of a user within a predetermined threshold from the detected gaze vector, a number of times a function is initiated by a user, locations previously targeted by a user, and a number of times a location has been previously target by a user. The historical usage information may be time stamped and the time stamp may be relied upon to correlate to historical usage information with the current actions or gaze information of the user.

The controller 101 may be configured to predict the location of the gaze target by determining whether coordinates of the predicted location are within a detectable area, in response to determining that the coordinates are within the detectable area, the controller 101 is configured to calculate a difference between the predicted location and the location of the gaze target and update the kinematic model based on the calculated difference. In this case, the controller 101 may also be configured to execute or perform a function based on the location of the gaze target. The controller 101 may also be configured to execute or perform a function based on the predicted location in response to determining that the coordinates are outside the detectable area. For example, the function may be to update a predictive model or predictive model database based on gaze patterns of the user.

The function performed by the controller 101 may be to control output 104 to provide an output of one or more of visual, audible or haptic feedback. Moreover, the function performed by the controller 101 may be to output information via communication device 108 to another component of the vehicle or server that would store or process the information.

According to an exemplary embodiment, the controller 101 may perform or execute one or more functions to control to perform an active safety measure such as braking, maintaining a lane of a vehicle, forward collision avoidance, a safety notification such as an indicator light or chime, etc., based on predicting the location of the gaze of user. For example, the function may be to provide instructions to train a driver. The instructions to train a driver may be instructions regarding vehicle speed, applying a brake of a vehicle, steering a vehicle, or controlling a component of a vehicle. In another example, if vehicle speed and steering information indicate a lane change has occurred, the gaze information of the user indicates a shoulder (blind spot) check was performed, but no turn indicator was activated, then driver training with respect to a turn signal may be provided. Alternatively, if no blind spot check was performed, then driver training with respect to a blind spot check may be provided. In addition, another function that may be performed may be to adapt active safety measures when specific situations are met and/or to adapt interfaces to the gaze of the user over time.

According to an exemplary embodiment, the function performed by the controller 101 may be to control to output information to displays, for example, by providing a user interface for a user of a vehicle. For example, the controller 101 may be configured to identify when driver focus is being directed to a center stack screen and to slightly brighten the display within a set limit or display information at the center stack based on the location of the gaze of the user. According to another example, the controller 101 may be configured to identify when driver focus is being directed to a center stack screen and display specific or targeted information based on the vehicle context information. According to yet another example, the controller 101 may be configured to identify when driver focus is being directed to a specific button or element and to brighten specific user interface elements (e.g., a soft button). In yet another example, the controller 101 may be configured to warn the driver if the driver's gaze is not directed in a proper location, such as the road ahead when driving, the road behind when reversing, blind spots prior to turning or changing lanes. Moreover, a notification can be dismissed based on the location of the gaze of the user.

Figure 2:
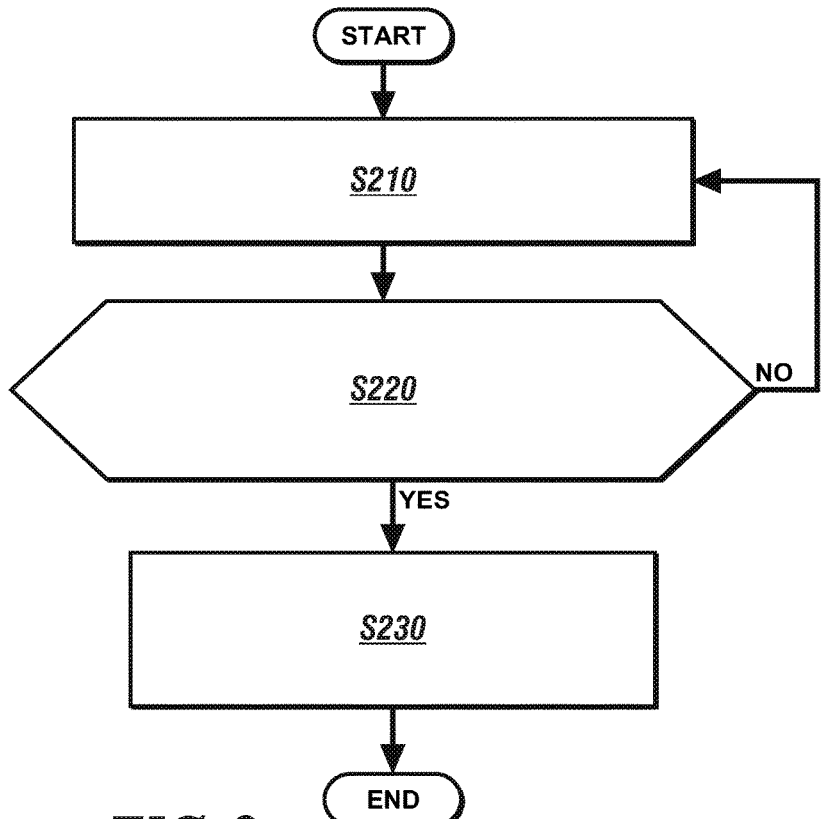
FIG. 2 shows a flowchart of a method for predicting targets of visual attention according to an exemplary embodiment.

FIG. 2 shows a flowchart of a method for predicting targets of visual attention according to an exemplary embodiment. The method of FIG. 2 may be performed by the gaze tracking apparatus 100 or may be encoded into a computer readable medium as instructions that are executable by a computer to perform the method. Referring to FIG. 2, gaze information associated with the gaze of the user is received in operation S210. Based on the gaze information, it is determined whether change information associated with the gaze of the user is greater than a threshold value in operation S220. If it is determined that the change information is greater than the threshold value in operation S220—Yes, then at least one from among a gaze vector of the gaze of the user and a location of a gaze target of a gaze of the user is predicted in operation S230. If it is determined that the change information is not greater than the threshold value in operation S220—Not, then the method returns to receive gaze information associated with the gaze of the user in operation S210.

Figure 3:
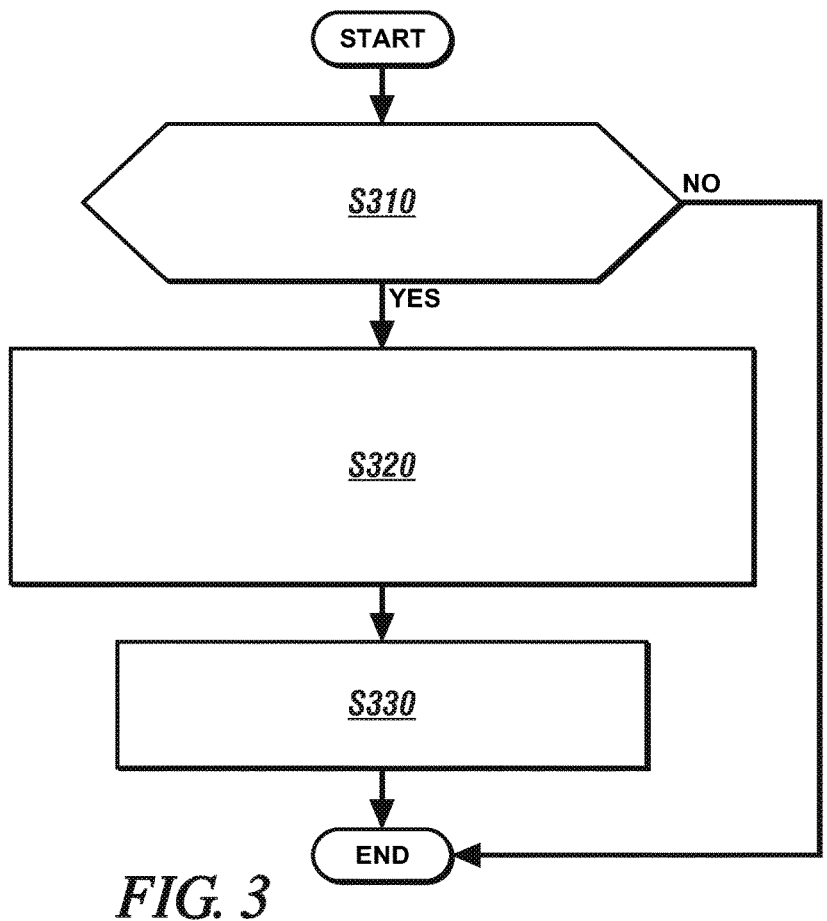
FIG. 3 shows a flowchart for predicting a gaze vector according to an aspect of an exemplary embodiment.

FIG. 3 shows a flowchart for a method of predicting a gaze vector according to an aspect of an exemplary embodiment. Referring to FIG. 3, it is determined whether a gaze vector corresponds to a location associated with a function in operation S310. If it is determined that the gaze vector corresponds to a location associated with a function, then method proceeds to S320, otherwise the method ends. In operation S320, in response to determining that the gaze vector corresponds to the location associated with the function, a likelihood that the gaze vector corresponds to the location associated with the function is calculated based on at least one from among historical usage information and vehicle context information. The function is then performed based on the determined likelihood in operation S330. For example, if the likelihood value of a function or functions meet or exceed a threshold value, the function(s) may be performed. In another example, if multiple functions correspond to the predicted gaze vector, a function or functions with the greatest likelihood value(s) may be performed.

Figure 4:
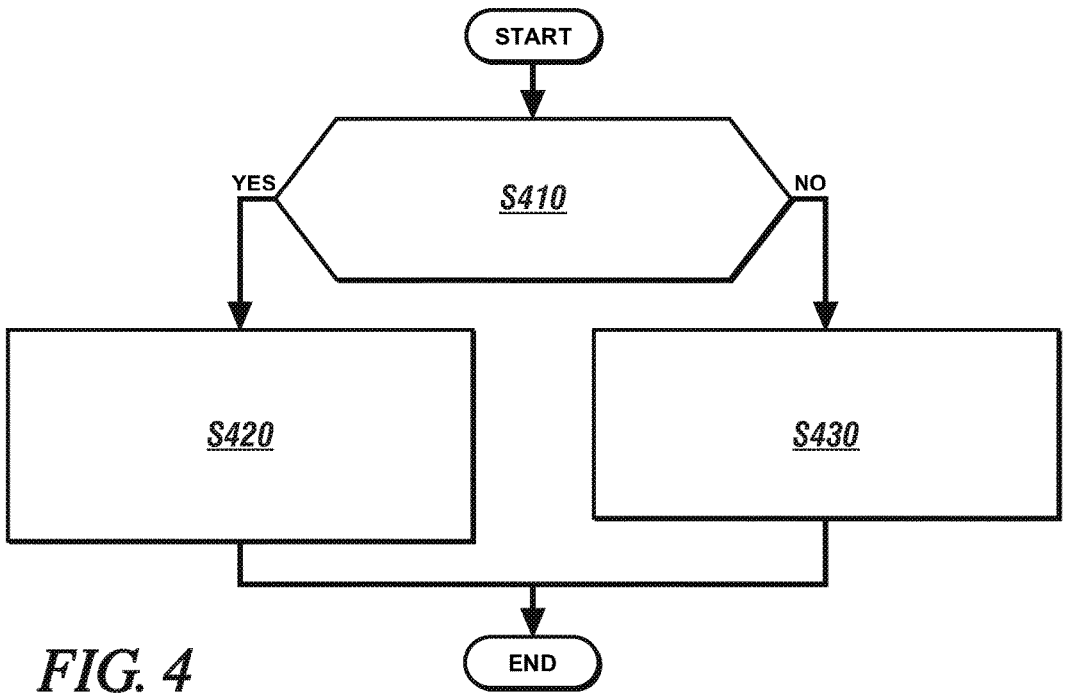
FIG. 4 shows a flowchart for predicting a gaze target according to an aspect of an exemplary embodiment.

FIG. 4 shows a flowchart for a method of predicting a gaze target according to an aspect of an exemplary embodiment. Referring to FIG. 4, it is determined whether coordinates of the predicted location are within a detectable area in operation S410. If it is determined that the coordinates of the predicted location are within the detectable area, a difference between the predicted location and the location of gaze target are calculated and the kinematic model is updated based on the calculated difference in operation S420. In this case, a function may also be executed based on the location of the gaze target. If it is determined that the coordinates of the predicted location are outside the detectable area, a function is performed based on the predicted location in operation S430. For example, the coordinates of the predicted location may be a location that is a predetermined distance or threshold value from the detectable area or one or more coordinates that make up the detectable area. Alternatively, a function may be performed based on the predicted location and a determined likelihood in operation S430. In this case the determined likelihood would be calculated based on at least one from among historical usage information and vehicle context information.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for tracking a gaze of a user in a vehicle, the method comprising:

receiving gaze information associated with the gaze of the user;

based on the gaze information, determining whether change information associated with the gaze of the user is greater than a threshold value; and in response to determining that the change information is greater than the threshold value, predicting at least one from among a gaze vector of the gaze of the user and a location of a gaze target of the gaze of the user based on a kinematic model, where the gaze of the user is outside of a detectable area;

wherein the predicting the location of the gaze target comprises:

determining whether coordinates of the predicted location are within the detectable area;

in response to determining that the coordinates are within the detectable area, calculating a difference between the predicted location and the location of the gaze target and updating the kinematic model based on the calculated difference; and in response to determining that the coordinates are outside the detectable area, executing a function based on the predicted location, historical usage information, and vehicle context information.

2. The method of claim 1, wherein the determining whether the change information associated with the gaze of the user is greater than the threshold value is performed in response to receiving a plurality of samples of the gaze information.

3. The method of claim 2, wherein the predicting the gaze vector comprises:

determining whether the predicted gaze vector corresponds to a location associated with the function;

in response to determining that the predicted gaze vector corresponds to the location associated with the function, determining a likelihood that the predicted gaze vector corresponds to the location associated with the function based on at least one from among the historical usage information and the vehicle context information; and executing the function based on the determined likelihood.

4. The method of claim 3, wherein the historical usage information comprises at least one from among functions previously initiated by the user, previously stored gaze vectors of the user within a predetermined threshold from the gaze vector, a number of times a function is initiated by the user, locations previously targeted by the user, and a number of times a location has been previously target by the user.

5. The method of claim 3, wherein the vehicle context information comprises information on at least one from among an event associated with a vehicle, steering of a vehicle, turn indicator status, a speed of a vehicle, a location of a vehicle, an engine event or status, emission status, revolutions per minute of an engine, transmission status, tire pressure, door open/close status, trunk open/close status, window open/close status, interior/exterior temperature, barometric pressure, acceleration of a vehicle, user input, user applied pressure to an object or button in a vehicle, whether a passenger is in a seat, location and speed of external objects around the vehicle, information on which lights of a vehicle are activated, whether a car key is present in a vehicle, and a currently displayed screen on a display in a vehicle, a status of a vehicle, a status of a setting of a vehicle, identifiable visual stimulus which a user is to perceive, and a location of a function that is executable by the user.

6. The method of claim 1, wherein the gaze information comprises coordinate information of the gaze of the user and timing information of the gaze of the user.

7. The method of claim 6, wherein the kinematic model is calculated based on the coordinate information and the timing information.

8. The method of claim 1, wherein the threshold value is an indicator of whether the gaze of the user is outside of an area in which the gaze of the user is trackable within a specific degree of accuracy.

9. A non-transitory computer readable medium comprising instructions executable by a computer to perform the method claim 1.

10. An apparatus for tracking a gaze of a user, the apparatus comprising:
at least one memory comprising computer executable instructions; and
at least one processor configured to read and execute the computer executable instructions, the computer executable instructions causing the at least one processor to:
receive gaze information associated with the gaze of the user;
based on the gaze information, determine whether change information associated with the gaze of the user is greater than a threshold value; and
in response to determining that the change information is greater than the threshold value, predict at least one from among a gaze vector of the gaze of the user and a location of a gaze target of the gaze of the user based on a kinematic model, where the gaze of the user is outside of a detectable area,
wherein the predicting the location of the gaze target comprises:
determining whether coordinates of the predicted location are within the detectable area;
in response to determining that the coordinates are within the detectable area, calculating a difference between the predicted location and the location of the gaze target and updating the kinematic model based on the calculated difference; and
in response to determining that the coordinates are outside the detectable area, executing a function based on the predicted location, historical usage information, and vehicle context information.

11. The apparatus of claim 10, wherein the at least one processor is configured to determine whether the change information associated with the gaze of the user is greater than the threshold value in response to receiving a plurality of samples of the gaze information.

12. The apparatus of claim 11, wherein the predicting the gaze vector comprises:
determining whether the predicted gaze vector corresponds to a location associated with the function;
in response to determining that the predicted gaze vector corresponds to the location associated with the function, determining a likelihood that the predicted gaze vector corresponds to the location associated with the function based on at least one from among the historical usage information and the vehicle context information; and
executing the function based on the determined likelihood.

13. The apparatus of claim 12, wherein the historical usage information comprises at least one from among functions previously initiated by the user, previously stored gaze vectors of the user within a predetermined threshold from the gaze vector, a number of times a function is initiated by the user, locations previously targeted by the user, and a number of times a location has been previously target by the user.

14. The apparatus of claim 12, wherein the vehicle context information comprises information on at least one from among an event associated with a vehicle, steering of a vehicle, turn indicator status, a speed of a vehicle, a location of a vehicle, an engine event or status, emission status, revolutions per minute of an engine, transmission status, tire pressure, door open/close status, trunk open/close status, window open/close status, interior/exterior temperature, barometric pressure, acceleration of a vehicle, user input, user applied pressure to an object or button in a vehicle, whether a passenger is in a seat, location and speed of external objects around the vehicle, information on which lights of a vehicle are activated, whether a car key is present in a vehicle, and a currently displayed screen on a display in a vehicle, a status of a vehicle, a status of a setting of a vehicle, identifiable visual stimulus which a user is to perceive, and a location of a function that is executable by the user.

15. The apparatus of claim 10, wherein the gaze information comprises coordinate information of the gaze of the user and timing information of the gaze of the user.

16. The apparatus of claim 15, wherein the kinematic model is calculated based on the coordinate information and the timing information.

17. The apparatus of claim 10, wherein the threshold value is an indicator of whether the gaze of the user is outside of an area in which the gaze of the user is trackable within a specific degree of accuracy.

18. The apparatus of claim 17, wherein the specific degree of accuracy is three degrees or less.

* * * * *